Jan. 10, 1967     C. L. STEVENSON     3,297,429
CONTROLLED ATMOSPHERE MAGNETIC ROASTING OF IRON ORE
Filed Oct. 28, 1963
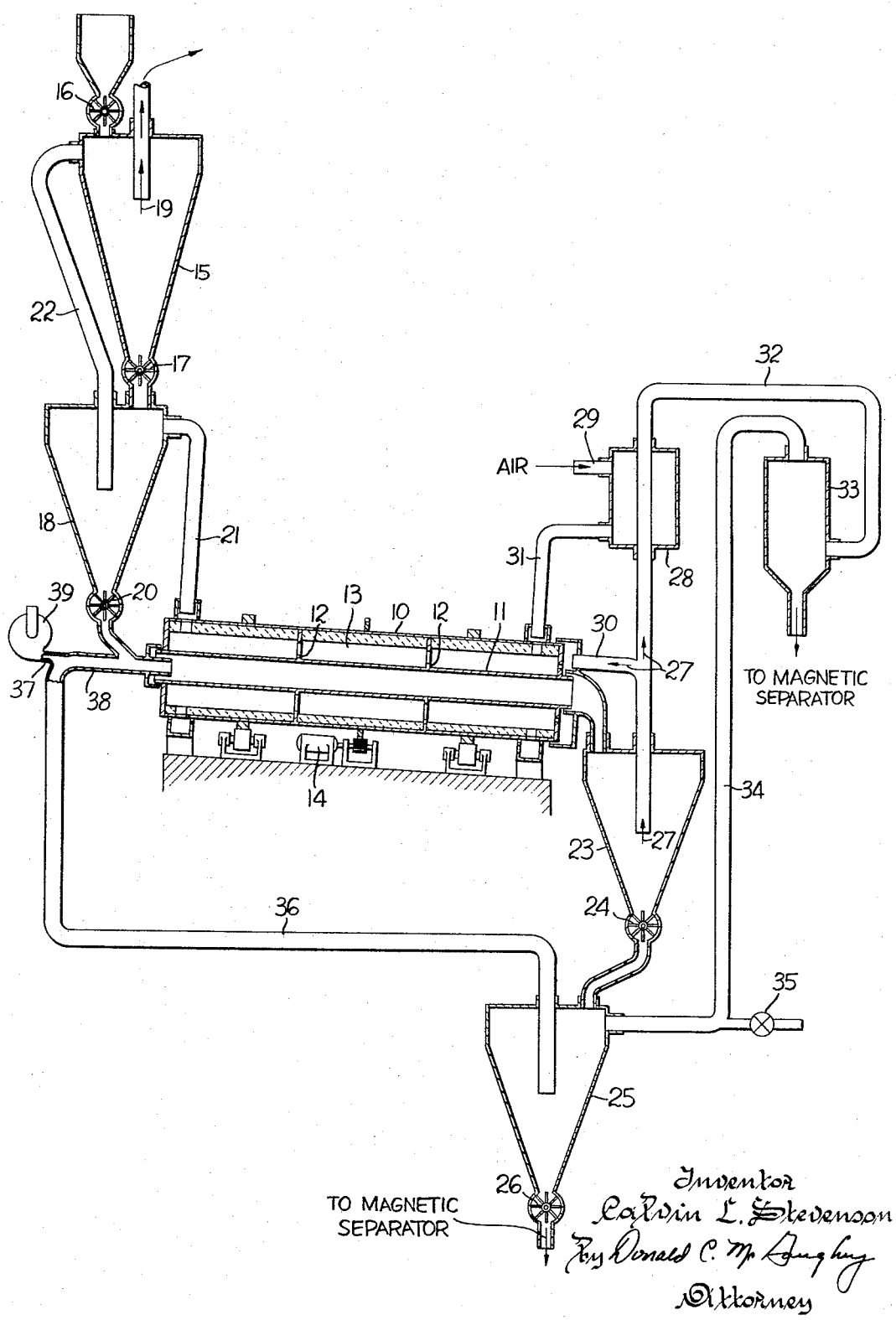

3,297,429
CONTROLLED ATMOSPHERE MAGNETIC ROASTING OF IRON ORE
Calvin L. Stevenson, Milwaukee, Wis., assignor to Allis-Chalmers Manufacturing Company, Milwaukee, Wis.
Filed Oct. 28, 1963, Ser. No. 319,125
9 Claims. (Cl. 75—1)

This invention relates generally to concentrating iron ore. In a more specific aspect, this invention relates to an apparatus and process for the reduction of the higher iron minerals such as hematite, to the lower magnetic spinel-type oxide, magnetite, which can very easily be concentrated by low cost magnetic separation.

As the high grade, more easily processed ores of the Mesabi Range are becoming depleted, more and more interest is being directed toward the abundant marginal taconite ore deposits in the Lake Superior area. The quality of these ore deposits, however, is of such a nature that they are not desirable for profitable commercial operations. Although many processes have been developed to concentrate and recover such ores by various techniques, none of these processes have as yet been able to attain any substantial degree of commercial success.

One of the many concepts pursued in this development has been that of magnetic roasting wherein the nonmagnetic iron oxides such as hematite are converted to magnetic magnetite. It has long been known that the higher, nonmagnetic oxides can be reduced by roasting to a lower magnetic oxide form. After such a process the ores can be concentrated by low cost magnetic separation thus avoiding the higher cost concentration operations such as tabling, jigging, leaching or flotation.

Many processes employing magnetic roasting have been developed and several pilot plants built in accordance with these processes. All furnaces that meet the requirements for reduction furnaces have been tested on pilot scale such as rotary kilns, shaft kilns, rabble roasters, fluidized bed reactors, horizontal traveling grates and so on. All these processes and furnaces have been shown to have some major economic shortcoming of one kind or another. For example, the shaft kilns can tolerate only a small amount of fines without causing channeled gas flow due to dust clogging. The rabble roaster on the other hand requires the use of fines which result in excessive comminution costs and has poor thermal efficiency. Rotary kilns have been characterized by poor thermal efficiency, severe dust loss problems and limitations on gas recovery. For all the presently known processes there appears to be economic shortcomings as high fuel consumption, severe heat and dust losses or excessive comminution costs, which severely limit the development of commercial operations. It is apparent that there still remains a need for efficient processes to concentrate the nonmagnetic taconite ores by inexpensive commercial operations.

Magnetic roasting processes are usually based upon the exposure of nonmagnetic iron minerals (as hematite, limonite, siderite and goethite) to the chemical action of diluted reducing gases at temperatures ranging from 800 to 1400° F. The reductant, or reducing gas, is usually carbon monoxide and/or hydrogen in equilibrium with carbon dioxide and/or water vapor. The ratio of the mixture must be of sufficient strength to permit reduction only to the lower oxide form, magnetite, $Fe_3O_4$. Controls must be maintained so the overreduction to wustite, FeO, will not occur since wustite, being nonmagnetic is undesirable.

Broadly speaking, this invention comprises three main stages: (1) the drying and preheating stage where the ore is dried and preheated in countercurrent cyclones using the hot spent gases from the kiln, (2) the reduction stage conducted in a concentric double tube kiln where preheated reducing gases are blown through the kiln concurrently with the ore carrying the finer ore particles through rapidly in a flash roasting type action, and (3) the ore cooling and gas preheating stage where the reduced ore is cooled and quenched in a mixture of fresh hydrocarbon fuel such as methane or reducing gases from solid fuel reformers and cool spent reducing gas; this gas mixture being preheated for use as the reducing gas.

Accordingly, it is a primary object of this invention to provide the apparatus and process for a magnetic roasting system having reduced comminution costs and reduced dust clogging problems by processing both coarse and fine materials in the same reaction zone wherein the smaller ore particles are blown through in a flash roasting reaction while the larger particles are tumbled through for a longer furnace retention time.

It is a further and primary object of this invention to reduce heat losses in the process by utilizing waste heat in the gas to heat the reaction zone and preheat the ore, and utilizing the waste heat in the processed ore to preheat the reducing gas or fuel.

It is still a further and primary object of this invention to reduce dust losses by utilizing a sealed system with cyclones to control dust flow with the ore flow despite the countercurrent gas flow.

These and other objects and advantages are fulfilled by this invention as will become apparent from a full understanding of the following detailed description, especially when read in conjunction with the drawing which is a schematic representation of the magnetic roasting process employed in this invention.

The apparatus of my invention is schematicallly shown in the figure. The kiln employed is of a concentric double tube type having an outer insulation tube or shell 10, encircling an interior tube or reaction zone 11. The two tubes are spaced apart by suitable supports 12 to define an annulus 13. The entire kiln is rotated by a motor 14. Such concentric double tube kilns are well known in the pyroprocessing industry and thus need not be further described here.

At the head of the kiln, a series of at least two cyclone dust collectors 15 and 18 are employed for drying and preheating the ore concurrently, with hot gases obtained from the annulus 13 of the kiln. Conduit 21 conveys hot gases from the annulus 13 in the kiln to cyclone 18, and conduit 22 conveys the gaseous discharge from cyclone 18 to cyclone 15. The first cyclone 15 is fitted with a star or gate feeder 16 of the sealed type. Such sealed feeders are well known in the art and other suitable sealed feeders may be employed for gate feeder 16 (or other shown gate feeders) without departing from the scope of the present invention. At the bottom, or solids discharge of cyclone 15, another gate feeder 17 is provided for feeding the ore from cyclone 15 into cyclone 18. The gaseous discharge 19 from cyclone 15 is conveyed to a dust collector (not shown) or permitted to go to waste. Gate feeder 20, at the bottom of cyclone 18, feeds the preheated ore into the kiln.

At the discharge end of the kiln a dust collector 23, preferably of the cyclone type, is positioned to receive the reaction product and gases from the interior tube 11 in the kiln. At the solids discharge of the dust collector 23, a gate feeder 24 is provided for feeding the reacted and separated solids into another cyclone 25 for cooling the solids and preheating the reducing gase. Gate feeder 26 at the discharge of cyclone 25, permits removal of the solids from the system.

The gaseous discharge 27 from the dust collector 23 is split, a part thereof being conveyed to a heat exchanger 28 with the other part being conveyed through conduit 30, to the annulus 13 in the kiln. Heat exchangers for two gaseous phases are well known in the art and any suitable heat exchanger may be employed without departing from the scope of this invention. The heat exchanger 28 is adapted to cool the discharge gases from the dust collector 23 and to heat ordinary air from the atmosphere received through inlet 29. The heated air is then conveyed to the annulus 13 in the kiln by conduit 31.

Conduit 32 is provided to convey the cooled furnace gases from heat exchanger 28 to a scrubbing tower 33 for removal of dust particles.

Conduit 34 recycles the cooled gases from tower 33 into cyclone 25, while a fresh hydrocarbon fuel such as methane gas or solid fuel reformed gas such as producers, gas is admitted therewith through valve 35.

The gaseous discharge from cyclone 25 is conveyed through conduit 36 for recycling through the kiln, while fresh air is admitted therewith through pipe 37, from the blower 39.

One practice of the present invention will now be described. First the flow will be detailed as to the ore passage in sequence, and thereafter the sequence of gas flow will be detailed.

To begin with, of course, the ore must first be ground. The degree of grinding may vary substantially, but a grind of about a minus 65 mesh was found to give a practical balance between grinding costs and furnace retention time for most ores tested.

Referring now to the figure, the ground ore is fed into the countercurrent cyclone 15 through a gate or star feeder 16. The countercurrent cyclone 15 serves to dry the wet ground ore and may be any of the conventional types of cyclones used and sold as dust collectors. It is well known in the art that such cyclones have good heat exchange characteristics between gas and fines and thus the process need not be further detailed here.

The wet ores in cyclone 15 comes in contact with hot, spent reducing gases admitted to the cyclone 15 from conduit 22, are swirled, dried, and fall into gate feeder 17. From this gate feeder the dried ore passes into another cyclone 18 which may be much the same or identical to cyclone 15. In this second cyclone 18 the dried ore is further heated by hot, spent reducing gases coming directly from the kiln annulus through conduit 21.

This double cyclone system tends to utilize the waste heat from the spent reducing gases in drying and preheating the ore which in turn allows for a reduced furnace retention time. Since the sole function of these first two cyclones is to recover the waste heat from the spent reducing gases in prehating the ore, more than two such cyclones could be employed without departing from the spirit of this invention. Thus, three, four or even more cyclones could be employed at this stage if they would be necessary for maximum waste heat recovery.

The preheated ore from cyclone 18, or in any case the last cyclone in the ore preheating stage, is fed from gate valve 20 into the interior tube 11 of the concentric double tube kiln.

Along with the preheated ore, a mixture of air and preheated hydrocarbon gas or reducing gases from solid fuel reformers and spent reducing gas is also admitted into the interior tube through pipe 38 which constitutes the reductant in the kiln. The larger ore particles will be tumbled through the rotating interior tube 11 while in contact with the concurrent reducing gas atmosphere to function in much the same manner as any reducing kiln. However, the majority of the ore, or that portion at about a minus 200 mesh, will be blown rapidly through the interior tube 11 in the draft of the reducing gas. These fines are in effect flash roasted as they are blown through the kiln and thus have a far shorter furnace retention time than the larger particles which are tumbled through. This effect, of course, is quite desirable since the larger particles would necessarily need a longer furnace retention time. The fines, however, needing only a short retention time are blown through rapidly and hence the capacity of the system is increased since the fines are not retained longer than necessary and do not settle to cover the larger particles interfering with effective gas-solid contact.

The ore, having been reduced to magnetite, and the reducing gases are then passed from the kiln into a duct collector 23 which may be much the same or identical to the cyclones in the ore preheating stage. This dust collector separates the partially reduced ore from the hot spent reducing gases.

The sealed gate feeder 24 feeds the hot ore into cyclone 25 where the waste heat in the ore is recovered in preheating fresh reducing gas which is fed in through condut 34 and valve 35. Here again the primary objective is effective heat exchange and more than one cyclone may be employed if such is necessary to effectively recover the waste heat in the ore.

After the ore is cooled in cyclone 25, or series of cyclones as the case may be, the ore is passed out of the system by the sealed gate feeder 26. This ore is then ready for magnetic separation.

Having detailed the flow sequence of the ore in the system, the following paragraphs will detail one cycle of the flow circuit of the gases in the system.

A fuel such as methane gas, $CH_4$, is admitted from a pressurized source (not shown) through valve 35. This fresh hydrocarbon gas mixes with cool, spent reducing gas from pipe 34 and the mixture passes into cyclone 25 where the ore is cooled by the gas mixture and the gas mixture is in turn preheated by the ore. If more than two cyclones are used, then the fresh cool gas would first pass into the final cyclone and move up the series countercurrent to the ore flow.

From the ore cooling phase, the preheated gas mixture is conveyed through conduit 36 to the interior tube 11 of the concentric double tube kiln. Air is admitted from blower 39 through pipe 37 and allowed to mix with the methane and spent reducing gas mixture passing into the interior tube 11. The preheated methane gas will partially combust in contact with a limited supply of air from pipe 37 to form $CO+CO_2$ and $H_2+H_2O$ the necessary hot reducing gases. The amount of air admitted through pipe 37 should be so regulated to allow the proper ratio of air and methane gas as will be explained below.

The preheated reducing gas flowing through the hot reduction zone in the interior tube 11, comes in contact with the preheated ore tumbling therein to effect the partial reduction. As mentioned above, the finer ore particles, minus 200 mesh, will be blown through the kiln rapidly in the draft of the hot reducing gas to effect flash roasting.

From the kiln the spent reducing gases and the ore pass into the dust collector 23 where the bulk of the ore is separated from the gases. The hot, spent gases then pass out of cyclone 23 through pipe 27, and from there the gases may follow one of two courses.

The major portion of these hot spent gases pass into a heat exchanger 28 where the waste heat is transferred to a flow of fresh air. The cooled spent gases then pass into a scrubbing tower 33 where all of the ore particles in the gas are recovered. These fines, having been reduced may then be processed by magnetic separators. The cleaned reducing gas is then returned to cyclone 25 through conduit 34 to repeat the cycle.

The minor portion of the hot spent reducing gases from cyclone 23 and the hot air from heat exchanger 28 are passed into the annulus of the kiln 13 through conduits 30 and 31 respectively. The hot air and gases not only serve to insulate the reducing zone or interior tube 11, thus preventing substantial heat loss, but the contact of the hot spent reducing gases with the hot air will cause further burning of the spent reducing gases. This would be apparent since the reducing gases would not be completely burned or oxidized to the highest oxide form in the interior tube 11. Thus, the heat capacity of the waste reducing gases are fully utilized in maintaining the temperature of the kiln.

From the annulus 13 the hot exhaust gas passes out through conduit 21 and into cyclone 18 where the exhaust gas is cooled in preheating the ore. If more than one cyclone is used in the ore preheating stage, the gases will flow countercurrent to the ore flow until it flows into the drying cyclone 15. From the drying cyclone the exhaust gas is discharged from the system.

The exhaust gas is piped out of the system from cyclone 15 through the gas discharge 19 and may go to waste. If there are any values in the waste gas they could be recovered by passing the waste gas into another dust collector or scrubbing tower (not shown) to recover the values therefrom. Most of the values in the waste gas would be unreduced ore picked up in the drying and preheating cyclones, and thus would have to be returned to the system at gate feeder 16 to be processed.

Returning our attention to the combustion of the hydrocarbon gas, it has been noted above that the air through pipe 37 must be properly regulated so that the ratio of hydrocarbon gas is such as will produce the desired reducing strength. With methane gas as the fuel the typical reactions taking place will be:

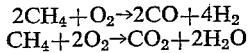

$$2CH_4 + O_2 \rightarrow 2CO + 4H_2$$
$$CH_4 + 2O_2 \rightarrow CO_2 + 2H_2O$$

or any variations thereof to produce $CO:CO_2$ and $H_2:H_2O$. As is well known in the art the reduction product is not only dependent upon the relative ratios of $CO_2:CO$ and $H_2:H_2O$ but also upon temperature. Equilibrium diagrams have been published which show the ratios necessary at varying temperatures to attain a reduction product of magnetite. Since such equilibrium diagrams are well known in the art they will not be detailed here.

Since the combustion of methane is of course exothermic, and the reduction of hematite to magnetite as described herein is also exothermic, no external heat source is needed in this process. Thus the quantity of air flow through pipe 37 is perhaps more important in controlling temperature than in controlling gas composition. Thus the temperature in the kiln can be controlled by controlling the air flow. Increasing air flow will increase temperature and vice versa. Furthermore, substantial changes in air flow can be made without detrimentally affecting the reducing strength of the gas. Further temperature controls can be maintained by regulating the quantity of hot air flow into the annulus 13 through conduit 31, and thus limiting the burning of the spent reducing gas admitted through conduit 30.

The most ideal quantity rates for the methane and air will vary somewhat from one ore to another, but any ideal conditions can be determined experimentally in operation, and thus need not be further discussed.

The embodiments of the invention for which an exclusive property or privilege is claimed are defined as follows:

1. The method of converting nonmagnetic iron ores to magnetic magnetite which comprises the steps of:
   (a) drying and preheating minus 65 mesh nonmagnetic iron ore;
   (b) blowing the preheated ore into the interior tube of a concentric double tube kiln with a reducing gas of sufficient reducing strength to reduce said ore to magnetite under sufficient pressure to blow the finer particles of said ore through the reaction zone to effect flash roasting thereof to magnetite;
   (c) tumbling the remaining preheated ore in said kiln for sufficient time to effect partial reduction to magnetic magnetite;
   (d) separating the spent reducing gases from the partially reduced ore;
   (e) cooling a portion of said spent reducing gases;
   (f) heating the annulus portion of the kiln with the remaining portion of the spent reducing gases; and
   (g) cooling the partially reduced ore with the cooled portion of said spent reducing gases and fresh hydrocarbon gas.

2. The method of converting nonmagnetic iron ores to magnetic magnetite which comprises the steps of:
   (a) blowing preheated ground ore into the interior tube of a concentric double tube kiln with a mixture of air, preheated hydrocarbon gas and preheated spent reducing gases with sufficient pressure to blow the finer particle of the said ore through the kiln to effect flash roasting thereof said air and gas mixture being of sufficient reducing strength to reduce said ore to magnetite;
   (b) tumbling the remaining ore particles in said reaction zone for sufficient time to effect a magnetic roast;
   (c) separating the reacted ore from the spent reducing gases;
   (d) cooling a portion of the separated spent reducing gases in a suitable heat exchanger with air, said air in turn being heated and conveyed into the annulus portion of said kiln along with the uncooled portion of the spent reducing gases;
   (e) cooling the separated ore with a mixture of hydrocarbon gas and the cooled spent reducing gases; and
   (f) preheating the ore prior to roasting with hot air and hot spent reducing gases from the annulus of the kiln.

3. The method of converting nonmagnetic iron ores to magnetic magnetite which comprises:
   (a) drying and preheating ground ore in a series of cyclone dust collectors with a countercurrent flow of hot gases comprising air and spent reducing gases;
   (b) blowing the preheated ore into the interior tube of a concentric double tube kiln with a mixture of air, preheated hydrocarbon gas and preheated spent reducing gases under sufficient pressure to blow the finer particles of said ore through the kiln to effect flash roasting thereof, said air and gas mixture being of sufficient reducing strength to reduce said ore to magnetite;
   (c) tumbling the remaining preheated ore particles in said kiln for sufficient time to effect the magnetic roast;
   (d) separating the spent reducing gases from the roasted ore;
   (e) cooling a portion of the separated spent reducing gases with air in a suitable heat exchanger to in turn heat the air;
   (f) heating the annulus portion of the kiln with the heated air from the said heat exchanger and the remaining portion of the separated spent reducing gases;
   (g) removing dust particles from the cooled spent reducing gases from the heat exchange of step (f); and
   (h) cooling the roasted ore with a mixture of methane gas and the cooled and cleaned spent reducing gases.

4. The method of converting nonmagnetic iron oxide ores to magnetic magnetite which comprises the steps of:
   (a) grinding nonmagnetic iron oxide ore to a size of about a minus 65 mesh;
   (b) drying the ground ore in a cyclone dust collector with a mixture of hot air and spent reducing gases;
   (c) preheating the said ground ore in a cyclone dust collector with a mixture of hot air and spent reducing gases prior to using the mixture for said drying step;
   (d) blowing the preheated ore into the interior tube of a concentric double tube kiln with a mixture of air, preheated hydrocarbon gas and preheated spent reducing gases, under sufficient pressure to blow the finer ore particles through the kiln to effect flash roasting thereof;
   (e) tumbling the remaining preheated ore particles in said kiln for sufficient time to effect the magnetic roast;
(f) separating the spent reducing gases from the roasted ore in a cyclone dust collector;
(g) cooling a portion of the separated spent reducing gases with air in a suitable heat exchanger to in turn heat the air;
(h) heating the annulus portion of the kiln with the heated air from the said heat exchanger and the remaining portion of the separated spent reducing gases;
(i) removing dust particles from the cooled spent reducing gases from the heat exchange of (g) in a suitable scrubbing tower; and
(j) cooling the roasted ore in a cyclone with a mixture of methane gas and the cooled and cleaned spent reducing gases.

5. In an apparatus for converting nonmagnetic iron oxide ores to magnetic magnetite:
(a) means for drying and preheating minus 65 mesh nonmagnetic iron oxide ore;
(b) means for blowing the preheated ore into a reaction zone with a reducing gas of sufficient reducing strength to reduce said ore to magnetite under sufficient pressure to blow the finer ore particles through the reaction zone to effect flash roasting thereof;
(c) means for tumbling the remaining preheated ore in said reaction zone for sufficient time to effect at least a partial reduction to magnetic magnetite;
(d) means for separating the reduced ore from the reducing gas;
(e) means for conducting the separated reducing gas to the ore recited at (a) for preheating the ore; and
(f) means for preheating the reducing gas recited at (b) with the separated reduced ore.

6. In an apparatus for magnetic roasting nonmagnetic iron oxide ores:
(a) a concentric double tube kiln;
(b) means for drying ground ore with a mixture of hot air and spent reducing gases;
(c) means for preheating the said ground ore with a mixture of hot air and spent reducing gases;
(d) means for blowing the preheated ore into the interior tube of the concentric double tube kiln with a mixture of air, preheated hydrocarbon gas and preheated spent reducing gases of sufficient pressure to blow finer particles through the kiln;
(e) means for separating the spent reducing gases from the roasted ore;
(f) means for cooling a portion of said separated spent reducing gases with air whereby the air is heated;
(g) means for heating the annulus portion of the kiln with the said heated air and the remaining portion of the separated spent reducing gases;
(h) means for removing dust particles from the cooled spent reducing gases; and
(i) means for cooling the roasted ore with a mixture of methane gas and the cooled and cleaned spent reducing gases.

7. Apparatus for the magnetic roasting of non-magnetic iron oxide ores comprising in combination; a concentric double tube kiln having an interior tube for roasting the ore with a reducing gas and surrounded by an outer shell to define an annulus therebetween, means for separating the roasted ore and spent reducing gases emerging from the kiln, means for cooling a portion of the spent reducing gases and heating air from the atmosphere, means for conveying the heated air and uncooled portion of the spent reducing gases to the annulus portion of the kiln, means for cooling the roasted ore with a mixture of methane gas and the cooled spent reducing gases whereby the said gas mixture is heated, means for blowing the heated gas mixture and air into the interior tube of the kiln, and means for drying and preheating the ore prior to roasting with the hot air-gas mixture from the annulus portion of the kiln.

8. Apparatus for magnetic roasting of nonmagnetic iron oxide ores comprising in combination; a concentric double tube kiln having an interior tube for roasting the ore with a reducing gas and surrounded by an outer shell to define an annulus portion therebetween, a cyclone dust collector positioned to receive the roasted ore and spent reducing gases from the interior reaction tube of the kiln and separate said gases from said roasted ore, a heat exchanger for cooling a portion of said spent reducing gases and for heating air from the atmosphere, means for conveying the heated air and the uncooled portion of the spent reducing gases to the annulus portion of the kiln, a scrubbing tower for removing residual dust particles from the cooled spent reducing gases, a cyclone for cooling the separated roasted ore with a mixture of hydrocarbon gas and the cooled spent reducing gas whereby the said mixture is heated, means for mixing said gas mixture with air and blowing said mixture into the interior tube of the kiln, a cycline for preheating the ore prior to roasting with the hot mixture of air and spent reducing gas from the annulus of the kiln, and another cyclone for drying the ore prior to preheating with the hot air-gas mixture from the preheating cyclone.

9. The method of converting ground nonmagnetic iron ore to magnetite which comprises the steps of:
(a) blowing preheated ground nonmagnetic iron ore into a reaction zone with a preheated reducing gas of sufficient strength to reduce said ore to magnetite, said reducing gas being admitted at sufficient pressure to blow the finer particles of said ore through said reaction zone to effect flash roasting thereof to magnetite;
(b) maintaining the remaining ore particles in said reaction zone for a sufficient time to effect at least a partial reduction thereof to magnetite;
(c) separating the reduced ore from said reducing gas;
(d) utilizing a portion of the separated reducing gas to preheat the ground ore in step (a); and
(e) utilizing the separated reduced ore to preheat the reducing gas utilized in step (a).

References Cited by the Examiner
UNITED STATES PATENTS

| | | | |
|---|---|---|---|
| 1,588,420 | 6/1926 | Hindshaw | 75—1 X |
| 1,832,069 | 11/1931 | Wechter | 75—1 |
| 1,961,424 | 6/1934 | Maier. | |
| 2,964,308 | 12/1960 | Walde | 75—7 |
| 3,068,091 | 12/1962 | Kirkland | 75—36 |

FOREIGN PATENTS

| | | |
|---|---|---|
| 674,465 | 6/1952 | Great Britain. |

BENJAMIN HENKIN, *Primary Examiner.*